Patented July 14, 1936

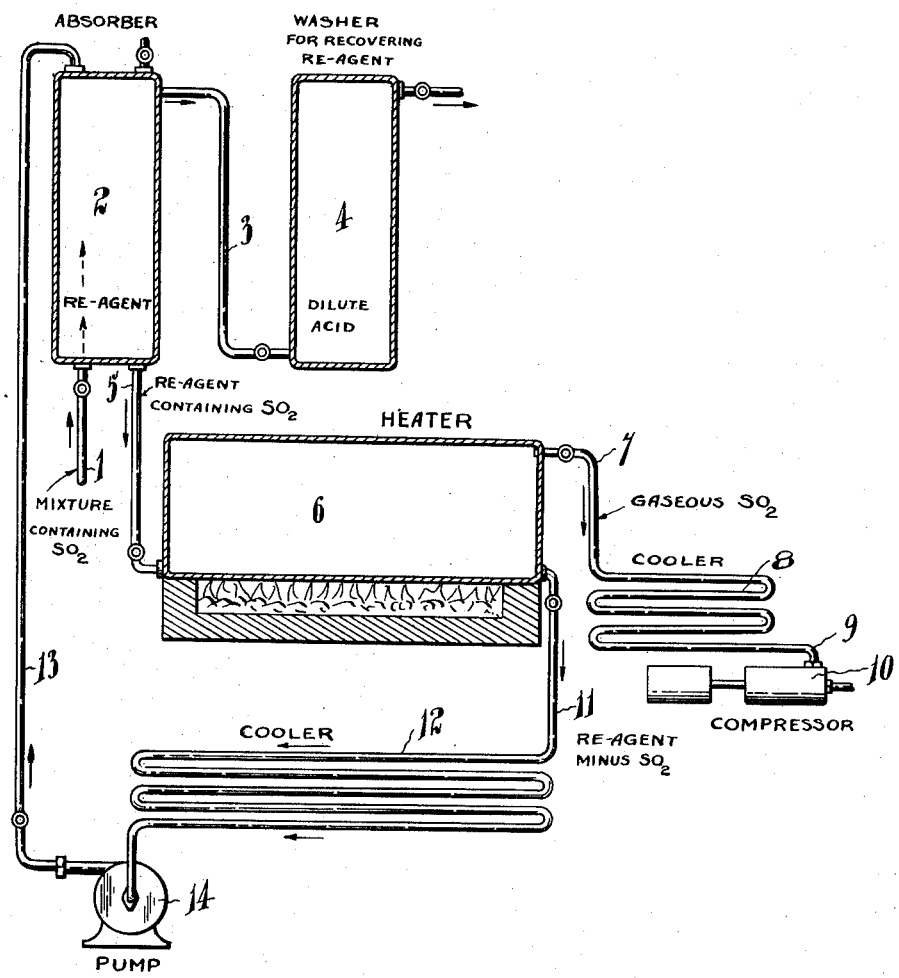

2,047,819

UNITED STATES PATENT OFFICE 2,047,819

PROCESS OF SEPARATING SULPHUR DIOXIDE FROM GASEOUS MIXTURES

Maitland C. Boswell and George P. Beal, Toronto, Ontario, Canada

Application October 27, 1932, Serial No. 639,784

2 Claims. (Cl. 23—178)

This invention relates to a process such as set forth in the co-pending application of Maitland C. Boswell #480,450 dated September 8th, 1930 in which quinoline, or an equivalent, with a proportion of water was used to absorb and react with sulphur dioxide to form a chemical compound which was afterwards disassociated by the application of heat to again obtain the dioxide in gaseous form.

We have now found that certain other bases, not heretofore usable since the products of their reaction with the base were solids, may be made available by adding to the water-base complex an acid such as lactic acid or a solution of citric acid, tartaric acid or hydrochloric acid. Glycerol, ethyleneglycol, di-ethyleneglycol and resorcin have also been used to advantage.

The base it is preferred to use is aniline, since it is a commercial product obtainable at a low cost, though o-toluidine, p-toluidene xylidine and tri-ethanolamine may also be employed. The process also possesses some advantages when the base employed is pyridine, quinoline, isoquinoline or acridine.

Assuming lactic acid to be employed with aniline, the process is substantially as follows: A mixture is made of aniline, lactic acid and water. The amount of water may vary, but the lactic acid is, preferably, the chemical combining equivalent of the aniline.

In the case of solid acids a saturated solution in water may be employed using a suitable quantity of the solution to give a suitable proportion of acid to base.

The aniline-water-acid mixture is then used to take up sulphur dioxide from gases with which it is mixed.

The process is carried out as follows: The gas containing sulphur dioxide, preferably freed from dust and sulphur trioxide and cooled to a temperature preferably below 30° C., although higher temperatures may be used, is passed through towers or absorbers containing, or through which is passing, at a temperature preferably below 30° C. (although temperatures considerably higher may be used), the prepared reagent. The exit gases which contain a small amount of the vapor of the base used are passed through a tower or washer where the gas meets dilute acid, such as dilute sulphuric acid, or hydrochloric acid in order to remove the base. At intervals this acid solution of base is treated with lime or other inorganic base for the recovery of the organic base, or if sulphurous acid is used the organic base may be recovered by heating to expel the sulphur dioxide when the free organic base separates. The liquid from the washing tower or absorber and holding the sulphur dioxide is run into a heater where it is heated to a sufficient temperature to drive off the sulphur dioxide, a temperature of 110°–125° C. being suitable at atmospheric pressure. The sulphur dioxide thus driven off passes into a cooler which serves two purposes, one, to cool the sulphur dioxide gas for the compressor to which the gas next passes, and second, to catch the small amount of base which escapes with the sulphur dioxide under certain conditions of working and which separates in the cooler as the reaction product of the base and sulphur dioxide or of base, water and sulphur dioxide. This base may be recovered from time to time. The sulphur dioxide may next pass to a compressor for collection as compressed gas or liquid sulphur dioxide. The base or base-water mixture is now made to flow through a cooler so as to lower its temperature to about 30° C. and is pumped into washing towers or scrubbers for the removal of sulphur dioxide from more gas.

By using several washing towers or absorbers the waste gas containing sulphur dioxide can be run through one or more of these while the liquid saturated with sulphur dioxide is being run out of one or more other towers or absorbers into the heater and while the sulphur dioxide is being recovered and the base or its solution is being cooled and made ready to be pumped back again into the towers or absorbers. Or the process can be made continuous, cooled base being continuously pumped to the washing towers or absorbers and the base containing sulphur dioxide being continuously run out of the absorbers into the heater.

The drawing shows diagrammatically a suitable lay out of a plant using one absorber and one heater, broken arrows showing the flow of gas and solid arrows the flow of liquid.

Referring to the drawing, 1 is the pipe through which gaseous mixture containing sulphur dioxide is led to the absorber 2 containing the vehicle by which the sulphur dioxide is picked up. 3 is a pipe connecting the absorber 2 with a washer 4 in which any of the reagent carried over is recovered. By means of the pipe 5 the liquid containing the sulphur dioxide is led to the heater 6. From the heater 6 the gaseous sulphur dioxide is led, by means of the pipe 7, to the cooler 8, from which a pipe 9 leads to the compressor 10. The liquid from which the sulphur dioxide has been expelled is led by means of the pipe 11 to the cooler 12. From this cooler the liquid is returned to the absorber 2 through the pipe 13 in which is positioned the pump 14.

This process possesses all the advantages of the process of the co-pending application hereinbefore referred to as compared with processes based solely on solution of the sulphur dioxide in water or other liquid.

It also possesses the following advantages over the earlier process:

1. It enables us to use bases which react with sulphur dioxide to form solids and which are obtainable at low cost.

2. The bodies, such as lactic acid, used to prevent the formation of solid precipitates are cheap articles of commerce so that the process as a whole is much cheaper than that using quinoline.

3. The reagent added to the base, such as lactic acid causes a lowering of the vapor pressure of the base and hence reduces the quantity of base carried off by the gases issuing from the absorption chamber.

It has also been found that the use of lactic acid with bases such as quinoline produces a solution which is hydroscopic which aids in the production of dry sulphur dioxide.

What we claim as our invention is:

1. In a process of separating sulphur dioxide from gaseous mixtures the step which consists in bringing the gaseous mixture into intimate contact with a mixture of aniline and lactic acid.

2. In a process of separating sulphur dioxide from gaseous mixtures the step which consists in bringing the gaseous mixture into intimate contact with a mixture of aniline, water and lactic acid.

MAITLAND C. BOSWELL.
GEORGE P. BEAL.